Figure 1:
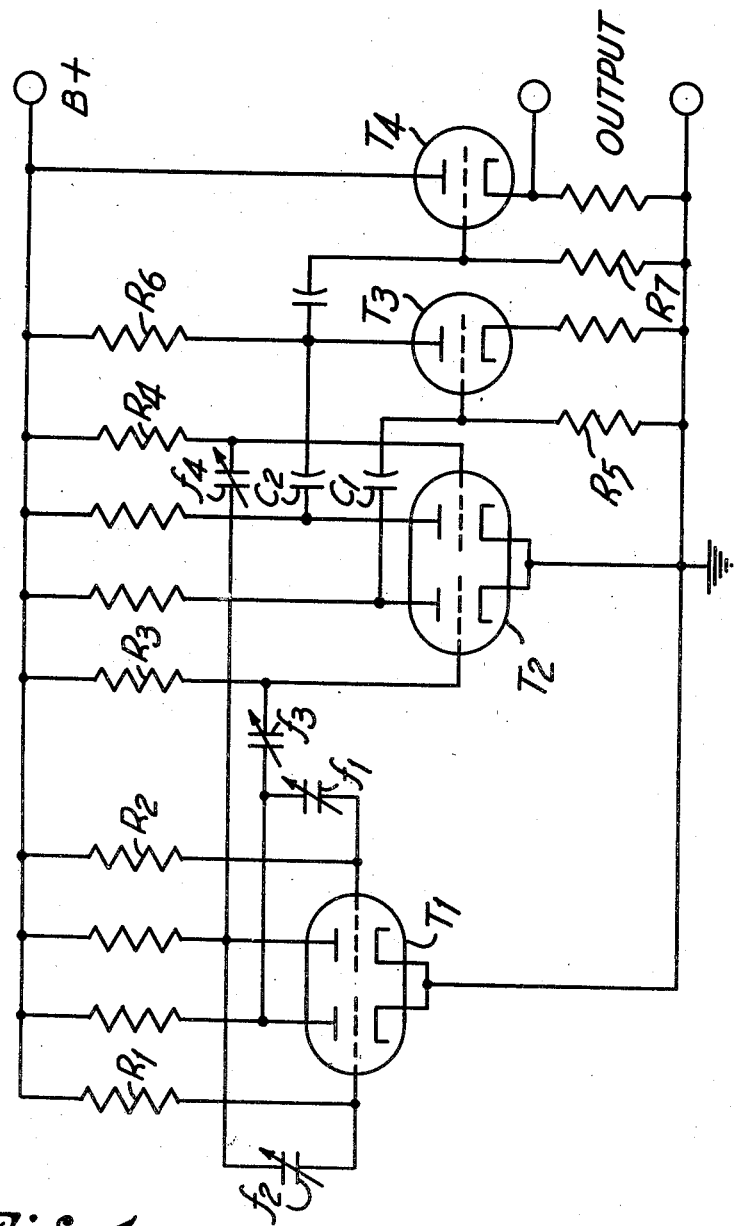

Patented May 23, 1950

2,508,895

UNITED STATES PATENT OFFICE 2,508,895

PULSE TRANSMITTING SYSTEM

Francis H. Shepard, Jr., Madison, N. J., assignor to Remco Electronic, Inc., New York, N. Y., a corporation of New York Original application November 21, 1944, Serial No. 564,466. Divided and this application May 16, 1947, Serial No. 748,454

9 Claims. (Cl. 332—14)

This application is a division of my copending application Serial No. 564,466, filed November 21, 1944.

It is an object of this invention to produce a spaced pulse wave which may be used to transmit four intelligences.

It is a further object of this invention to transmit a spaced pulse wave having three simultaneous intelligences, and which may be used to convey a fourth intelligence by its presence or absence.

Figure 2:
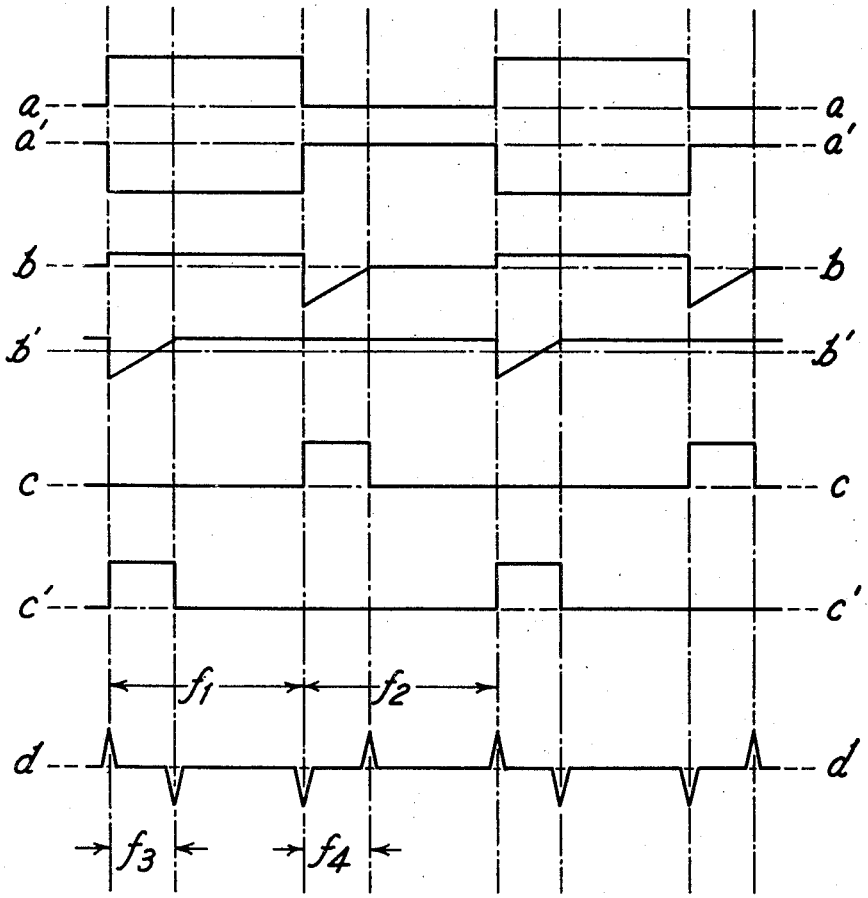

In the drawings:

Figure 1 is a circuit diagram illustrating a circuit for producing pulses as illustrated in curve $d$ of Figure 2, and Figure 2 is a series of curves illustrating the operation of the circuit of Figure 1.

For many purposes it is often desirable to transmit over a single communication channel at least four continuously variable intelligences. Means for accomplishing this are described below.

Figure 2 shows in curve $d$ a combination of positive and negative pulses spaced at variable time intervals with respect to each other. Four separate independently variable time intervals may be had in this system, as may be seen by reference to $f^1$, $f^2$, $f^3$, and $f^4$. There are many ways in which these pulses or types of pulse may be generated and utilized.

Means for the generation of these pulses are shown in Figure 1. The first part of this circuit, connected with tube $T^1$, is a multivibrator circuit familiar to those versed in the art, which can be controlled by variable condenser $f^1$, for the interval the circuit stays in one condition, and variable condenser $f^2$, to control the time interval that the circuit stays in the other condition. Curves $a$ and $a'$ (Fig. 2) show the shape of voltages occurring on the respective plates of the multivibrator. These voltages are coupled through variable condensers $f^3$ and $f^4$ across charging resistors $R^3$ and $R^4$ and the grid impedances of the tube $T^2$, so that the voltages shown in curves $b$ and $b'$ occur at the grids of the tube $T^2$. The condensers $f^3$ and $f^4$ are variable and, as seen below, determine the interval between successive opposite-polarity pulses in the output. These grid voltages result in plate currents flowing in tube $T^2$ in such a manner that the voltage drop across the plate load resistors takes the form shown in curves $c$ and $c'$. These voltages shown in $c$ and $c'$ are differentiated by means of condenser, resistance combinations $C^1$, $R^5$ and $C^2$, $R^6$. The voltage across $R^5$ is inverted by tube $T^3$ and placed across $R^6$. The combination of these differentiated voltages results in a voltage being applied to the grid of $T^4$ and appearing across the cathode resistor output in the form shown by curve $d$, which, as may be observed, will have two positive voltage surges, followed by two negative voltage surges, followed by two positive voltage surges etc. It can be seen that the pulses are so arranged that four functions, $f^1$, $f^2$, $f^3$, and $f^4$, are represented by the timed spacings as shown, and are controlled respectively by the four variable condensers $f^1$, $f^2$, $f^3$, $f^4$.

In an electroscriber (means for writing electrically at a distance) it is necessary to transmit two continuously variable functions for motions, that is, vertical and horizontal motion; it is necessary to lift the pencil on and off the paper, and it is necessary to shift the paper. To accomplish these purposes I have found it expedient to use three of the intelligences shown in curve $d$ (Fig. 2) in combination with a fourth on-off intelligence carried by the presence or absence of signal pulses which represent the first three intelligences. The functions used are $f^1$, $f^2$, and $f^3$, vertical and horizontal pencil position being indicated by $f^1$ and $f^2$, pencil lift by $f^3$, while $f^4$ is made an on-off function in order to shift the paper.

What is claimed is:

1. The method of simultaneously transmitting four intelligences which comprises generating a wave having successively two positive voltage surges in direct succession followed by two negative voltage surges in direct succession, wherein said intelligences are functions of the time between surges.

2. The method of simultaneously transmitting four intelligences which comprises generating a wave having successively two positive voltage surges in direct succession followed by two negative voltage surges in direct succession, varying the time between one of said positive voltage surges and one of said negative voltage surges in accordance with a first intelligence, varying the time between said one positive voltage surge and the other negative voltage surge in accordance with a second intelligence, independently varying the time between the other positive voltage surge and said one negative voltage surge in accordance with a third intelligence, and independently varying the time between said other positive voltage surge and said other negative voltage surge in accordance with a fourth intelligence whereby said intelligences are functions of the time between surges.

3. Apparatus for generating a single wave representing four intelligences, comprising a multivibrator circuit having a pair of electron tubes each having an anode and adjustable means responsive respectively to first and second ones of said intelligences for controlling the on and off periods of said multivibrator circuit, a pair of further electron tubes each having a grid, variable condenser means coupling each anode to a respective grid, said condenser means being respectively responsive to third and fourth ones of said intelligences, means differentiating the output of each of said further tubes, and means combining said differentiated outputs to provide said signal.

4. The method of simultaneously transmitting four intelligences which comprises producing a wave having repeated cycles of surges, each cycle having two surges of positive voltage followed by two surges of negative voltage, varying the time between the second surge of positive voltage and the second surge of negative voltage in correspondence with a first intelligence, varying the time between the second surge of negative voltage and the second succeeding surge of positive voltage in correspondence with a second intelligence, varying the time between the second surge of positive voltage and the first surge of negative voltage in correspondence with a third intelligence, varying the time between the second surge of negative voltage and the first succeeding surge of positive voltage in correspondence with a fourth intelligence.

5. Means for generating a signal having spaced pulses representing four simultaneous intelligences, which comprises a multivibrator circuit having therein a pair of electron tubes each having an anode, a pair of vacuum tube relays each having a grid, and a condenser connecting each of the anodes of the multivibrator to a grid of one of the relays.

6. Means for generating a signal having spaced pulses representing four simultaneously variable intelligences, comprising a multivibrator circuit having therein a pair of electron tubes each having an anode, two variable means for controlling the rate of operation of the multivibrator, each of said variable means being responsive to one of said intelligences, two variable condensers, two vacuum tube relays each having a grid, and a circuit connection from each anode of the multivibrator through one of said variable condensers to a grid of one of said relays, said variable condensers being responsive to the third and fourth simultaneously variable intelligence.

7. Means for generating a signal having spaced pulses representing four simultaneous intelligences, comprising a multivibrator circuit having therein a pair of electron tubes each having an anode, means for controlling the rate of operation of the multivibrator, a pair of vacuum tube relays, means for differentiating the voltage on each anode of the multivibrator, and means for applying said differentiated voltage on the anodes to the grids of the relays.

8. The method of simultaneously transmitting four intelligences which comprises generating a wave having successive positive voltage surges in timed relationship with one another, generating a second wave having successive positive voltage surges in timed relationship with one another and with the voltage surges of the first wave, differentiating each of said waves to produce from each positive voltage surge a positive voltage surge and a negative voltage surge, inverting the phase of the voltage surges produced from one of said waves and combining in a single wave in timed relationship the inverted voltage surges produced from one wave and the voltage surges produced from the other wave.

9. Means for generating a single wave representing four intelligences, said wave having successively two positive voltage surges followed by two negative voltage surges which comprises a multivibrator circuit having therein a pair of electron tubes each having an anode, a pair of electron relays each having a grid, a condenser connecting each of the anodes to one of the grids, a phase inverter in the output circuit of one of said relays, and means for combining the wave in the output of said phase inverter with the wave in the output of the relay which is not connected to said phase inverter to produce said signal wave.

FRANCIS H. SHEPARD, Jr.

REFERENCES CITED

The following references are of record in the file of this patent:

UNITED STATES PATENTS

| Number | Name | Date |
|---|---|---|
| 2,189,317 | Koch | Feb. 6, 1940 |
| 2,289,987 | Norton | July 14, 1942 |
| 2,289,988 | Norton | July 14, 1942 |
| 2,300,999 | Williams | Nov. 3, 1942 |